US010669029B2

(12) United States Patent
Verny et al.

(10) Patent No.: US 10,669,029 B2
(45) Date of Patent: Jun. 2, 2020

(54) COMFORT PILOT SEAT KINEMATICS

(71) Applicant: Safran Seats, Plaisir (FR)

(72) Inventors: Christian Verny, Issoudun (FR); Baptiste Demigny, Bourges (FR); Guillerault Martin, Neuvy Pailloux (FR); Kulig Kryzysztof, Saint Valentin (FR)

(73) Assignee: Safran Seats, Plaisir (FR)

( * ) Notice: Subject to any disclaimer, the term of this patent is extended or adjusted under 35 U.S.C. 154(b) by 151 days.

(21) Appl. No.: 15/528,111

(22) PCT Filed: Nov. 19, 2015

(86) PCT No.: PCT/IB2015/058989
§ 371 (c)(1),
(2) Date: May 19, 2017

(87) PCT Pub. No.: WO2016/079713
PCT Pub. Date: May 26, 2016

(65) Prior Publication Data
US 2017/0341752 A1 Nov. 30, 2017

Related U.S. Application Data

(60) Provisional application No. 62/081,815, filed on Nov. 19, 2014.

(51) Int. Cl.
*B64D 11/06* (2006.01)
*B60N 2/18* (2006.01)
(Continued)

(52) U.S. Cl.
CPC ........ *B64D 11/064* (2014.12); *A47C 1/03205* (2013.01); *B60N 2/10* (2013.01);
(Continued)

(58) Field of Classification Search
CPC ........ A47C 1/03205; B60N 2/10; B60N 2/16; B60N 2/1814; B60N 2/1839;
(Continued)

(56) References Cited

U.S. PATENT DOCUMENTS 2,775,996 A * 1/1957 Millar ...................... B60N 2/34
297/111
3,712,666 A * 1/1973 Stoll ...................... A47C 1/036
297/61
(Continued)

FOREIGN PATENT DOCUMENTS

DE 10241250 4/2004
EP 2998222 A1 3/2016
(Continued)

OTHER PUBLICATIONS

Machine Translation of DE 10241250 (Year: 2019).*
(Continued)

*Primary Examiner* — James M Ference
(74) *Attorney, Agent, or Firm* — Kilpatrick Townsend & Stockton LLP

(57) ABSTRACT

Described are adjustable seats having a lower portion of a back rest attached to a seat frame having an upper frame and a lower frame. A pivot axis is positioned at an upper end of the lower portion of the back rest, and an upper portion of the back rest is pivotally attached to the pivot axis. The location of the pivot axis is configured to be positioned below a person's shoulders when the person is seated in the adjustable seat. The upper portion of the back rest is also pivotally adjustable relative to the lower portion of the back rest. A seat pan having a front portion pivotally coupled to a rear portion can be attached to the upper frame. An actuation mechanism is configured to simultaneously con-
(Continued)

trol a vertical height of the upper frame and a rotational position of the front portion of the seat pan.

10 Claims, 20 Drawing Sheets

(51) Int. Cl.
| | |
|---|---|
| *B60N 2/62* | (2006.01) |
| *B60N 2/22* | (2006.01) |
| *A47C 1/032* | (2006.01) |
| *B60N 2/10* | (2006.01) |
| *B60N 2/16* | (2006.01) |
| *B60N 2/20* | (2006.01) |

(52) U.S. Cl.
CPC ............ *B60N 2/16* (2013.01); *B60N 2/1814* (2013.01); *B60N 2/1839* (2013.01); *B60N 2/1842* (2013.01); *B60N 2/20* (2013.01); *B60N 2/22* (2013.01); *B60N 2/2222* (2013.01); *B60N 2/62* (2013.01); *B64D 11/0648* (2014.12); *B64D 11/0689* (2013.01)

(58) Field of Classification Search
CPC .......... B60N 2/1842; B60N 2/20; B60N 2/22; B60N 2/2222; B60N 2/62; B64D 11/064; B64D 11/0648; B64D 11/0689
See application file for complete search history.

(56) References Cited

U.S. PATENT DOCUMENTS

| | | | | |
|---|---|---|---|---|
| 4,423,904 A * | 1/1984 | Crawford | B60N 2/123 | 248/393 |
| 4,521,053 A * | 6/1985 | de Boer | A47C 1/022 | 297/291 |
| 4,641,884 A * | 2/1987 | Miyashita | B60N 2/2252 | 297/284.1 |
| 4,687,250 A * | 8/1987 | Esche | B60N 2/06 | 297/300.5 |
| 4,753,479 A * | 6/1988 | Hatsutta | B60N 2/1842 | 297/284.11 |
| 5,112,109 A * | 5/1992 | Takada | B60N 2/2222 | 297/320 |
| 5,199,679 A * | 4/1993 | Nakamura | B60N 2/1803 | 248/394 |
| 5,597,203 A * | 1/1997 | Hubbard | A47C 7/024 | 297/284.1 |
| 5,676,424 A * | 10/1997 | Winkelhake | B60N 2/1803 | 248/421 |
| 5,788,183 A * | 8/1998 | Marechal | B60N 2/34 | 244/118.6 |
| 5,882,060 A * | 3/1999 | Walk | B60N 2/42727 | 296/65.01 |
| 6,019,424 A * | 2/2000 | Ruckert | B60N 2/2222 | 297/216.12 |
| 6,022,074 A * | 2/2000 | Swedenklef | B60N 2/2222 | 297/216.14 |
| 6,024,406 A * | 2/2000 | Charras | B60N 2/2222 | 297/216.14 |
| 6,030,043 A * | 2/2000 | Habedank | B60N 2/067 | 297/320 |
| 6,106,065 A * | 8/2000 | Carroll | A47C 1/0347 | 297/325 |
| 6,135,558 A * | 10/2000 | Behrens | B60N 2/20 | 296/65.09 |
| 6,213,549 B1 * | 4/2001 | Wieclawski | B60N 2/2222 | 297/216.13 |
| 6,227,489 B1 * | 5/2001 | Kitamoto | B64D 11/00 | 244/118.5 |
| 6,283,547 B1 * | 9/2001 | Bauer | B60N 2/914 | 297/284.1 |
| 6,447,062 B1 * | 9/2002 | Jaekel | A47C 7/405 | 297/284.7 |
| 6,530,622 B1 * | 3/2003 | Ekern | B60N 2/2222 | 297/284.1 |
| 6,554,360 B1 * | 4/2003 | Wilke | B60N 2/0284 | 297/284.4 |
| 6,840,578 B1 * | 1/2005 | Su | A47C 1/025 | 297/300.1 |
| 7,547,068 B2 * | 6/2009 | Davis | B60N 2/2222 | 297/353 |
| 7,753,451 B2 * | 7/2010 | Maebert | B60N 2/686 | 297/344.11 |
| 8,303,036 B2 * | 11/2012 | Hankinson | B64D 11/06 | 297/317 |
| 2003/0080597 A1 * | 5/2003 | Beroth | A47C 1/0352 | 297/330 |
| 2003/0173810 A1 * | 9/2003 | Lee | B60N 2/2252 | 297/367 R |
| 2004/0080201 A1 * | 4/2004 | Verny | B64D 11/06 | 297/354.13 |
| 2005/0140194 A1 * | 6/2005 | Michael | A47C 1/03255 | 297/313 |
| 2006/0055214 A1 * | 3/2006 | Serber | B60N 2/0745 | 297/216.1 |
| 2006/0055219 A1 * | 3/2006 | Heimann | B60N 2/20 | 297/276 |
| 2006/0290188 A1 * | 12/2006 | Guillouet | B60N 2/2252 | 297/367 R |
| 2007/0069563 A1 * | 3/2007 | Herzog | A47C 9/002 | 297/284.3 |
| 2008/0164740 A1 * | 7/2008 | Harper | B60N 2/045 | 297/331 |
| 2009/0066136 A1 * | 3/2009 | Wen | B60N 2/2218 | 297/361.1 |
| 2009/0218868 A1 * | 9/2009 | Koga | B60N 2/1839 | 297/344.17 |
| 2010/0096896 A1 * | 4/2010 | Nonomiya | B60N 2/22 | 297/362 |
| 2010/0109387 A1 * | 5/2010 | Merensky | A47C 7/503 | 297/75 |
| 2010/0201167 A1 * | 8/2010 | Wieclawski | B60N 2/888 | 297/216.13 |
| 2010/0231013 A1 * | 9/2010 | Schlenker | B60N 2/0232 | 297/216.13 |
| 2010/0289312 A1 * | 11/2010 | Burr | B60N 2/06 | 297/313 |
| 2012/0048999 A1 * | 3/2012 | Schurg | B60N 2/2222 | 244/118.6 |
| 2012/0267930 A1 * | 10/2012 | Sharda | B60N 2/08 | 297/313 |
| 2012/0286553 A1 * | 11/2012 | Sharda | B60N 2/688 | 297/344.15 |
| 2012/0292967 A1 * | 11/2012 | Cailleteau | A47C 7/446 | 297/311 |
| 2013/0069408 A1 * | 3/2013 | Chen | A47C 1/03205 | 297/337 |
| 2013/0214576 A1 * | 8/2013 | Hoshi | B60N 2/1615 | 297/311 |
| 2014/0159436 A1 * | 6/2014 | Iacobucci | B60N 2/06 | 297/75 |
| 2017/0341752 A1 * | 11/2017 | Verny | B60N 2/62 | |

FOREIGN PATENT DOCUMENTS

| | | |
|---|---|---|
| FR | 2894194 | 6/2007 |
| GB | 2085719 | 5/1982 |

OTHER PUBLICATIONS

International Patent Application No. PCT/IB2015/058989, Search Report and Written Opinion, dated Feb. 18, 2016.
European Patent Application No. 15801952.1, Communication Pursuant to 94(3) EPC; Examination Report, dated Mar. 1, 2018.

* cited by examiner

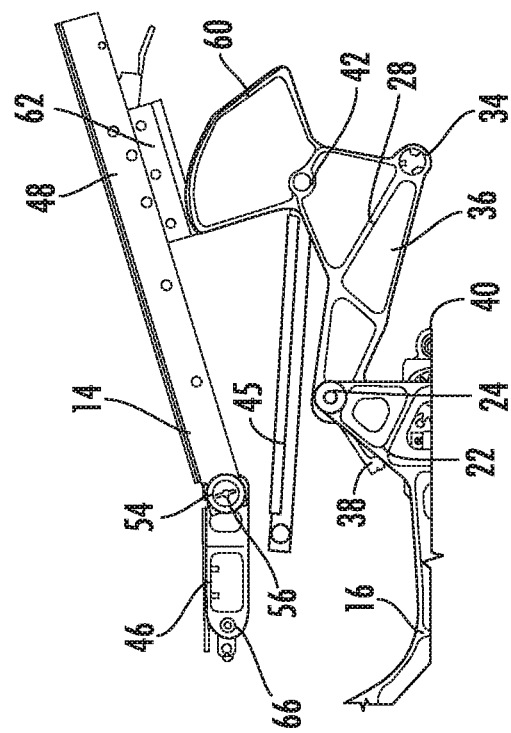
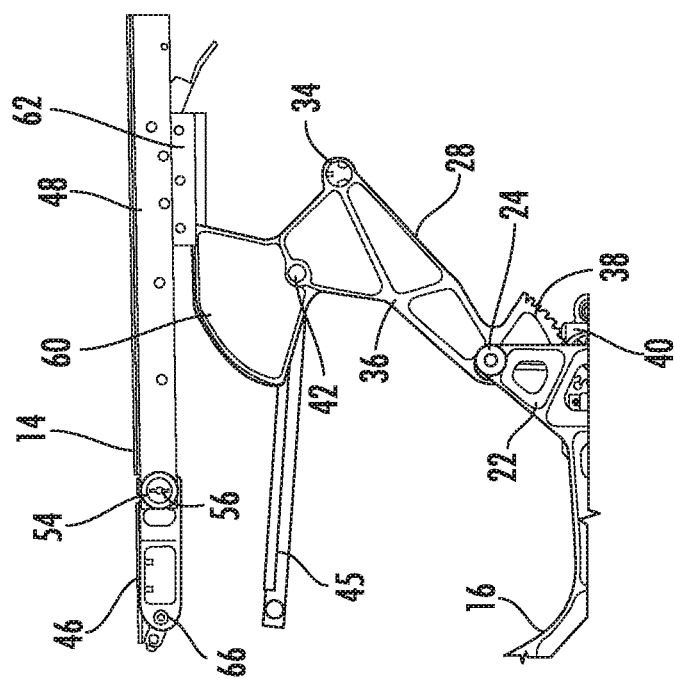

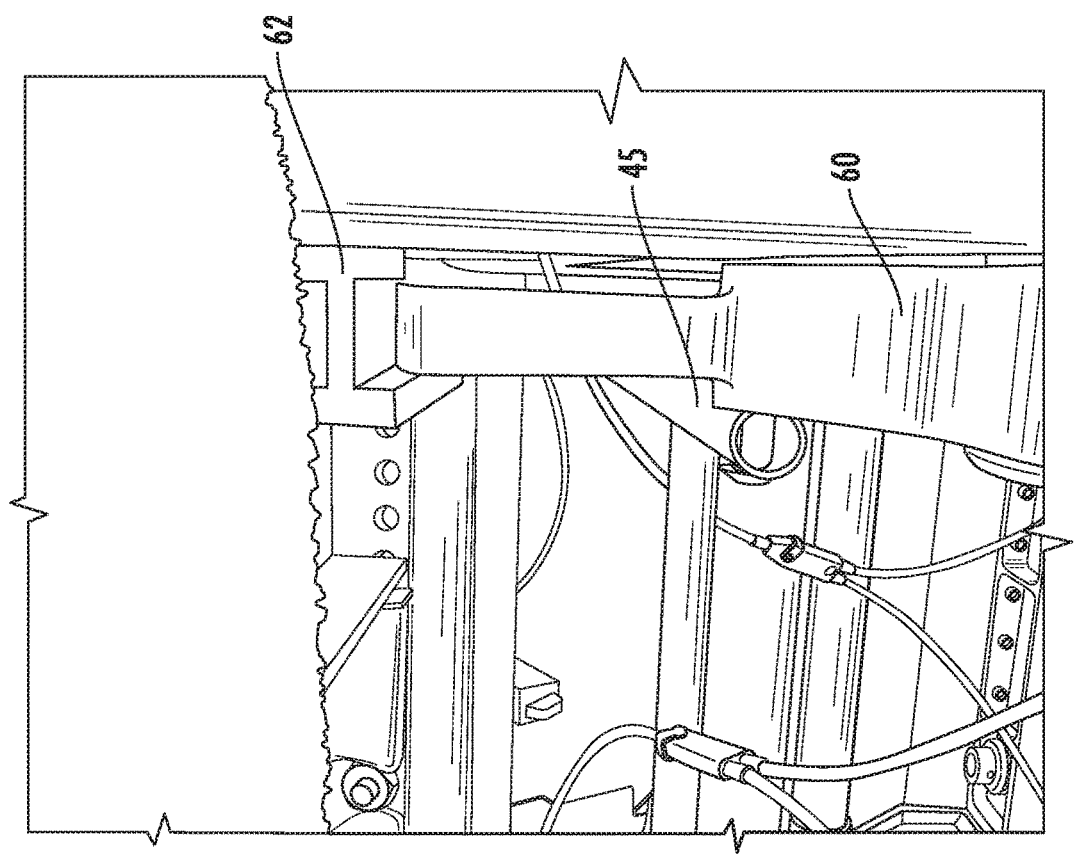
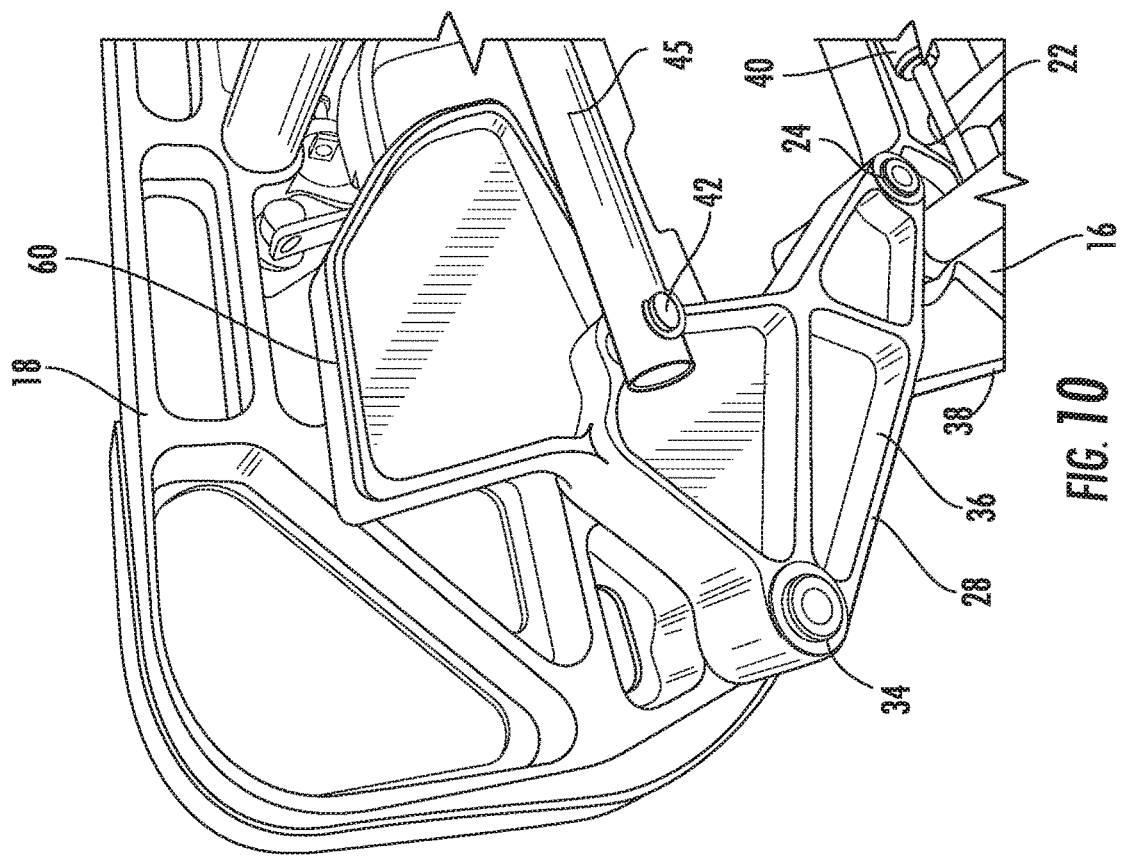

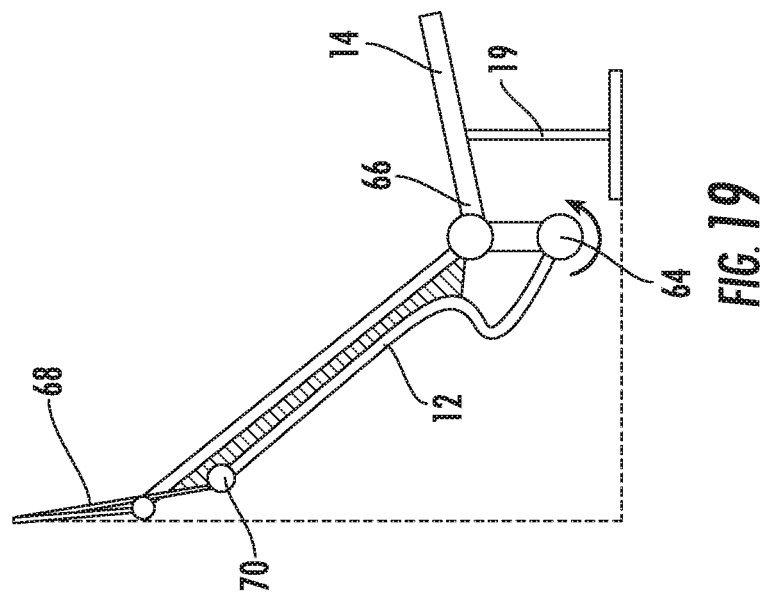
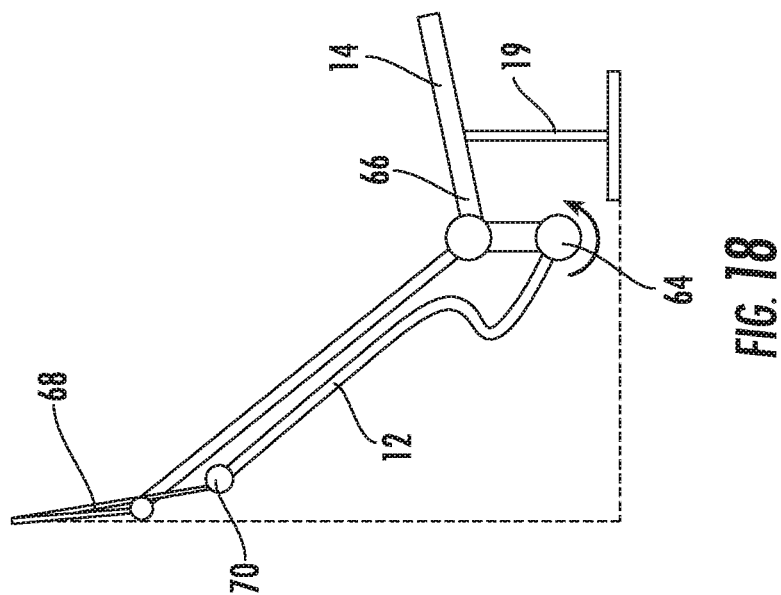

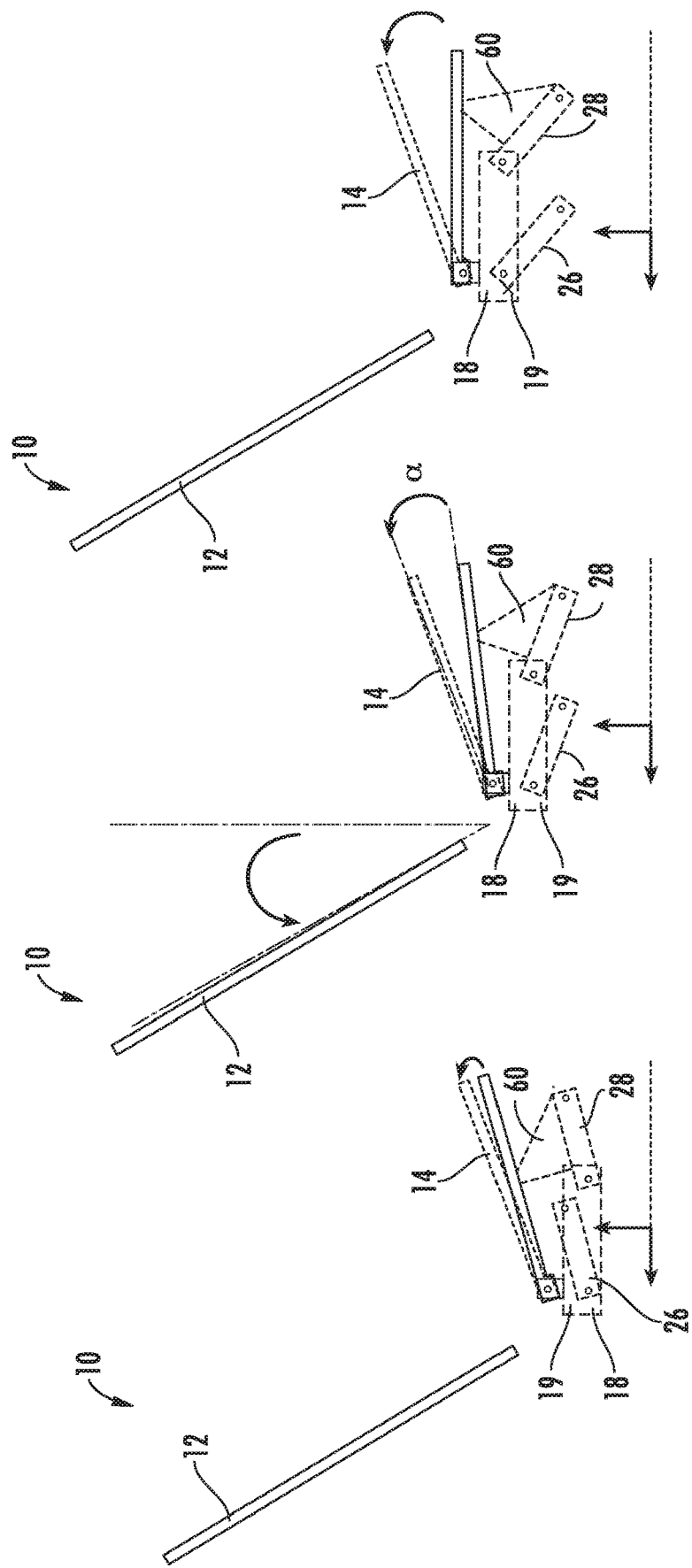

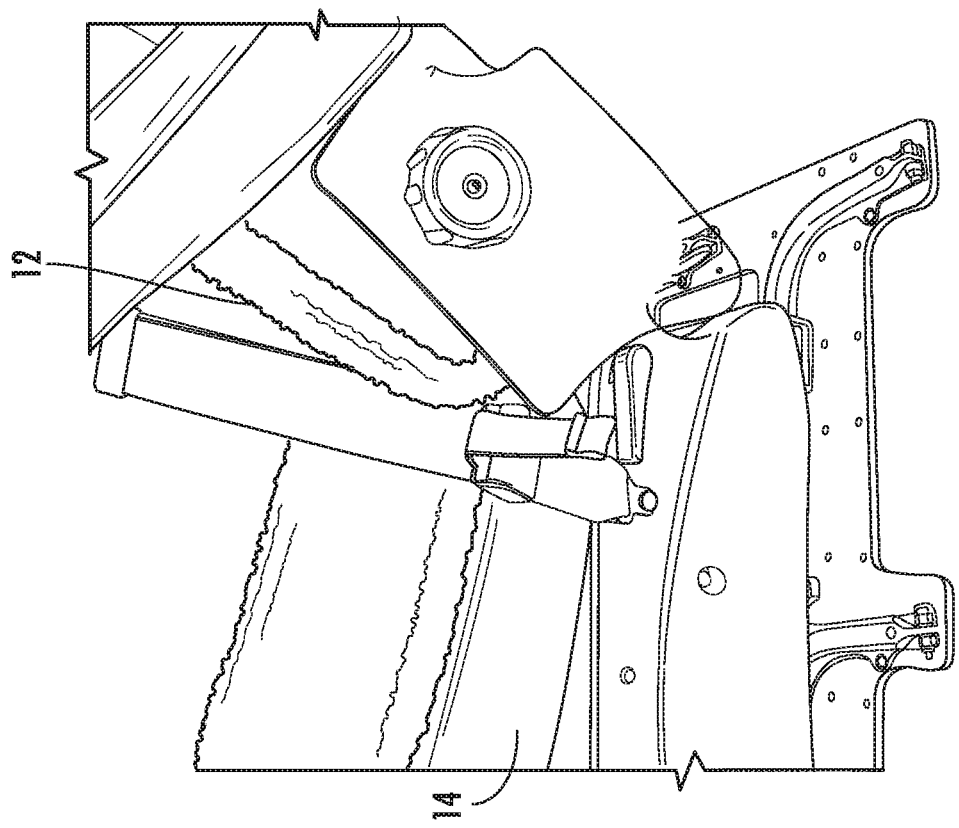
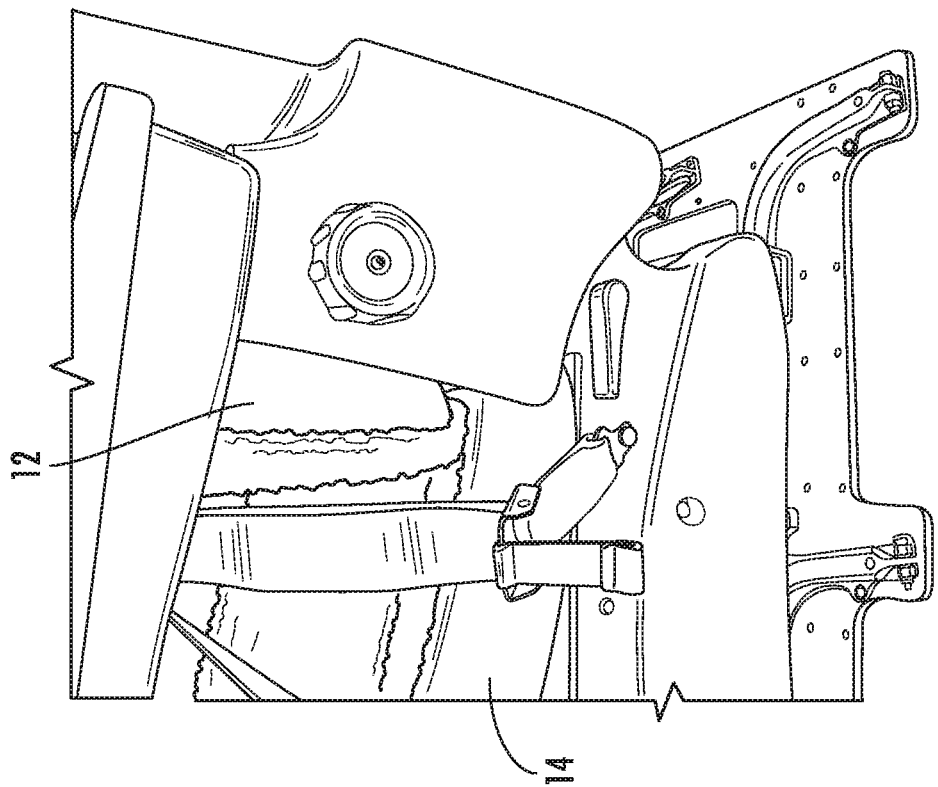

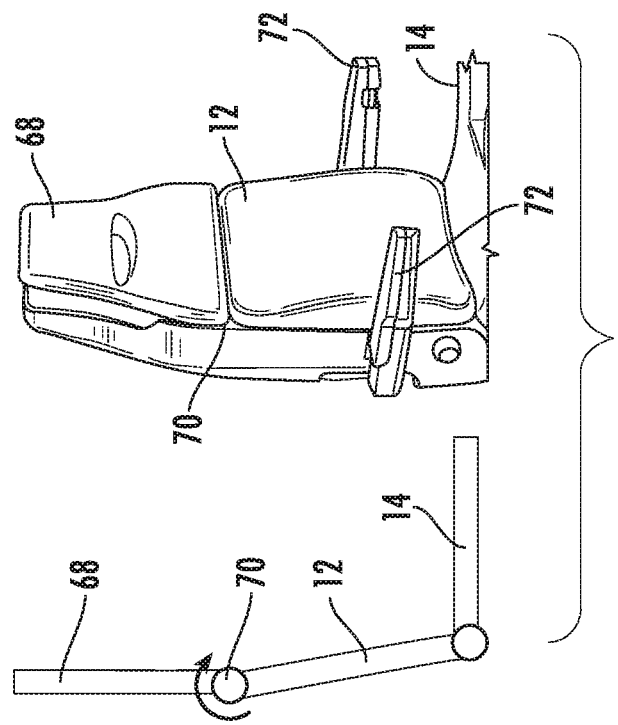
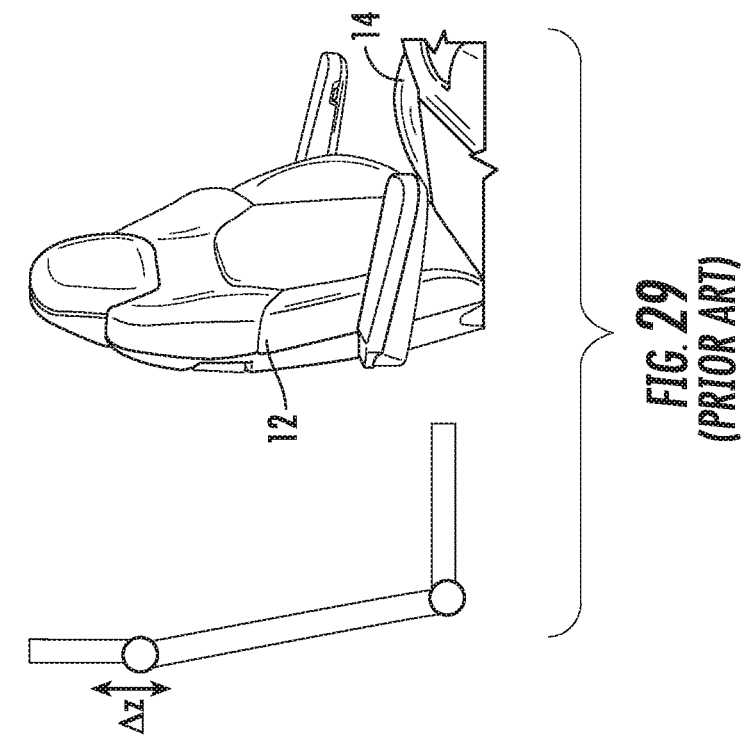
FIG. 30
FIG. 29 (PRIOR ART)

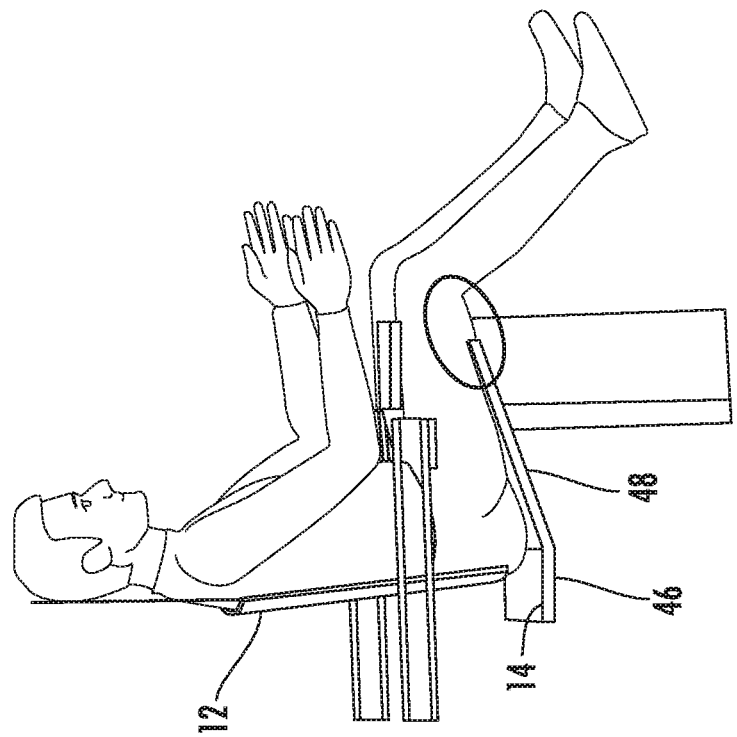
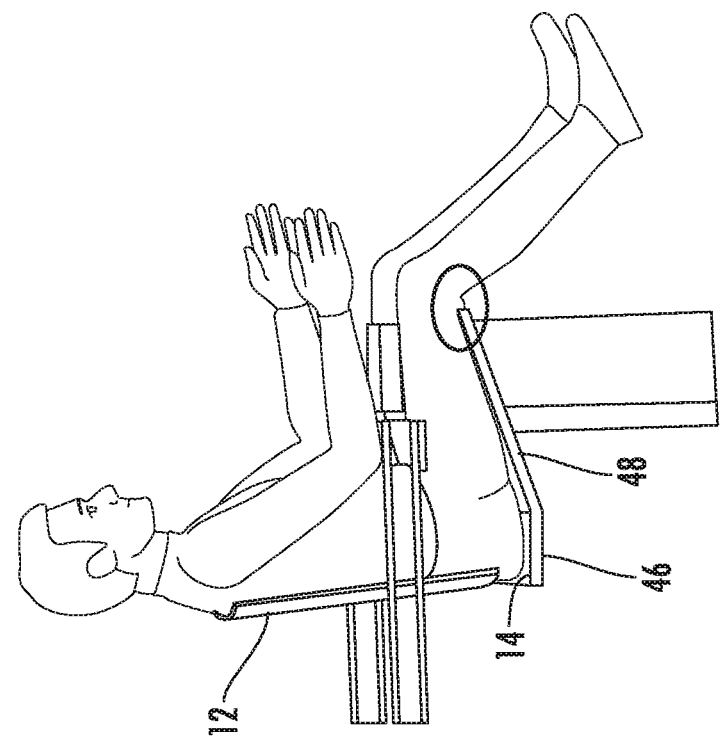

COMFORT PILOT SEAT KINEMATICS

CROSS REFERENCE TO RELATED APPLICATIONS

This application is the U.S. national stage entry of International Application Serial No. PCT/IB2015/058989 ("the '989 application"), filed on Nov. 19, 2015, which application is related to and claims priority benefits from U.S. Provisional Application Ser. No. 62/081,815 ("the '815 application"), filed on Nov. 19, 2014, entitled "COMFORT PILOT SEAT KINEMATICS." The '989 and '815 applications are hereby incorporated in their entireties by this reference.

FIELD OF THE INVENTION

The field of the invention relates to pilot seats or the like.

BACKGROUND

Many common carriers, such as passenger airlines, bus lines, and train lines, include a cockpit or command center where the pilot or driver controls the common carrier. In many cases, the typical seating height and/or lateral position may be insufficient for the pilot or driver to fully view his or her surroundings in order to properly anticipate, respond, and/or avoid incidents. In particular, the size and/or shape of the common carrier may be such that a portion of the field of vision is obstructed or difficult to easily view from the typical seating height and/or lateral position.

As a result, it may be desirable to provide a seat with extensive vertical and/or lateral adjustment options to adjust the seat position as needed to provide the pilot or driver with the ability to view the full area of vision as needed or desired.

In many cases, aircraft cockpits are designed based on a unique pilot vision reference. In other words, the pilots eyes need to be positioned at a unique location (also known as an "Eyes Reference Point" or "ERP"), which is the same location regardless of the pilot's physical dimensions. In addition to maintaining the same ERP, the pilot also needs to reach the rudder pedals with his feet and to grab the joystick or the yoke with his hands.

This eye positioning is enabled by utilizing seats offering wide vertical and longitudinal adjustments, as illustrated in FIG. 1. Due to the narrowness of the cockpit, there is no passageway between the seat and the central console. To allow the pilot get in and exit the seat, the seat has to be moved backwards and to be laterally stored. These seats typically have two independent main adjustments: height of the seat pan and longitudinal position of the seat. Storage is either combined with longitudinal adjustment by using J-shaped tracks which allow the seat to move laterally in the rear part of its trajectory (as shown on next picture), or provided by independent lateral tracks. As a result, the positioning adjustment currently involves many parameters.

These seats typically do not provide any mechanism to minimize blood pressure on a pilot's bottom and thighs. For example, as illustrated in FIGS. 2 and 6, existing seats have a fixed bottom pan (fixed angle $\beta_1$), and some adjustable thigh support in the front part of the bottom pan ($\beta_2$). Hence, the thigh support is not continuous because the bottom cushion shape does not match the pilot's thigh position.

These conventional pilot seats also do not provide a mechanism to adjust the seat pan length. As a result, a pilot seating position may not suit ERP if the pilot has to sit all the way forward, which can be an issue for smaller pilots.

Conventional pilot seats also have backrest recline capability to offer a relaxed position. However, because the back rest is pivotally coupled to a rear end of the bottom pan, the seat position moves forward when reclining the back rest, which reduces comfort. Also, a sliding effect appears due to an angle increase between the back rest and the seat pan.

Conventional pilot seats also offer head rests, but these head rests are typically configured so that they do not offer shoulder support in a relaxed position.

Moreover, the armrests are typically fixed, and therefore do not allow for lateral adjustment to provide lateral elbow support.

As a result, it may be desirable to provide a pilot seat that reduces the number of parameters to be adjusted to maintain ERP for pilots of varying size, provides thigh support that better contours to the pilot's thighs to reduce blood pressure on the pilot's bottom and thighs, provides an adjustable seat pan length to also reduce blood pressure on the pilot's thighs, provides a relaxed position that offers improved comfort, provides a back rest in two portions so that an upper portion of the back rest supports the shoulders of pilots of varying size in the relaxed position, and/or provides adjustable armrests to support pilots' elbow over a range of lateral positions.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an adjustable seat comprises a lower portion of a back rest attached to a seat frame, wherein an upper end of the lower portion of the back rest comprises a pivot axis, an upper portion of the back rest pivotally coupled to the lower portion of the back rest at the pivot axis, wherein the location of the pivot axis is configured to be positioned below a person's shoulders when the person is seated in the adjustable seat, and wherein the upper portion of the back rest is pivotally adjustable relative to the lower portion of the back rest.

In some embodiments, the seat frame comprises an upper frame pivotally coupled to a lower frame.

The seat may further comprise a seat pan comprising a rear portion and a front portion pivotally coupled to the rear portion, wherein the rear portion is attached to the upper frame. The seat may still further comprise an actuation mechanism that is configured to simultaneously control a vertical height of the upper frame and a rotational position of the front portion of the seat pan.

The lower portion of the back rest may be pivotally coupled to the upper frame at a location below the seat pan and is configured to pivotally adjust between an upright and a relaxed position. The lower pivot location may result in a rearward movement of a cushion reference point when the lower portion of the back rest is in the relaxed position. The rear portion of the seat pan may be slidably coupled to the upper frame.

In some embodiments, a pair of front legs and a pair of rear legs are pivotally coupled to the upper frame and the lower frame. Each front leg may comprise an eccentric cam having an outer surface in mating contact with a lower surface of the front portion.

According to certain embodiments of the present invention, an adjustable seat comprises a seat frame comprising an upper frame pivotally coupled to a lower frame, a seat pan comprising a rear portion and a front portion pivotally coupled to the rear portion, wherein the rear portion is attached to the upper frame, and an actuation mechanism that is configured to simultaneously control a vertical height of the upper frame and a rotational position of the front portion of the seat pan.

In certain embodiments, a pair of front legs and a pair of rear legs are pivotally coupled to the upper frame and the lower frame. Each front leg may comprise an eccentric cam having an outer surface in mating contact with a lower surface of the front portion.

In some embodiments, the seat may further comprise a lower portion of a back rest pivotally coupled to the upper frame at a location below the seat pan and configured to pivotally adjust between an upright and a relaxed position. The lower pivot location may result in a rearward movement of a cushion reference point when the lower portion of the back rest is in the relaxed position. The rear portion of the seat pan may be slidably coupled to the upper frame.

In some embodiments, the seat further comprises an upper portion of the seat back pivotally coupled to the lower portion of the back rest via a pivot axis located at an upper end of the back rest, wherein the location of the pivot axis is configured to be positioned below a person's shoulders when the person is seated in the adjustable seat.

The rear portion of the seat pan may be slidably coupled to the upper frame.

BRIEF DESCRIPTION OF THE DRAWINGS

FIGS. 9A-9B are side views of a portion of a seat frame and seat pan of an adjustable seat in a fully raised position and a fully lowered position, according to certain embodiments of the present invention.

FIG. 10 is a perspective view of a portion of a seat frame of an adjustable seat in a fully lowered position, according to certain embodiments of the present invention.

FIG. 11 is another perspective view of a portion of a seat frame of an adjustable seat in a fully lowered position, according to certain embodiments of the present invention.

FIGS. 18 and 19 are side views comparing the space available with the relaxed position of a conventional pilot and an adjustable seat, according to certain embodiments of the present invention.

FIGS. 24-26 are side views of an adjustable seat moving between a fully raised position and a fully lowered position, according to certain embodiments of the present invention.

FIG. 27 is a perspective view of a lower portion of a back rest coupled to an upper frame of an adjustable seat at a location below a seat pan in an upright position, according to certain embodiments of the present invention.

FIG. 28 is a perspective view of a lower portion of a back rest coupled to an upper frame of an adjustable seat at a location below a seat pan in a relaxed position, according to certain embodiments of the present invention.

FIG. 29 is a perspective view of a back rest of a conventional pilot seat with a head rest that has a vertical adjustment.

FIG. 30 is a perspective view of a lower portion of a back rest of an adjustable seat with an elongated upper portion of the back rest with pivotal adjustment, wherein the upper portion extends sufficiently high and has a pivot location that is sufficiently low so that the upper portion of the back rest has contact with a head of a person of any size, according to certain embodiments of the present invention.

FIG. 33 is a side view of a person seated in an adjustable seat before adjusting the seat pan to relieve pressure applied by the seat pan to the person's thighs, according to certain embodiments of the present invention.

FIG. 34 is a side view of a person seated in an adjustable seat after adjusting the seat pan to relieve pressure applied by the seat pan to the person's thighs, according to certain embodiments of the present invention.

DETAILED DESCRIPTION

Figure 1:
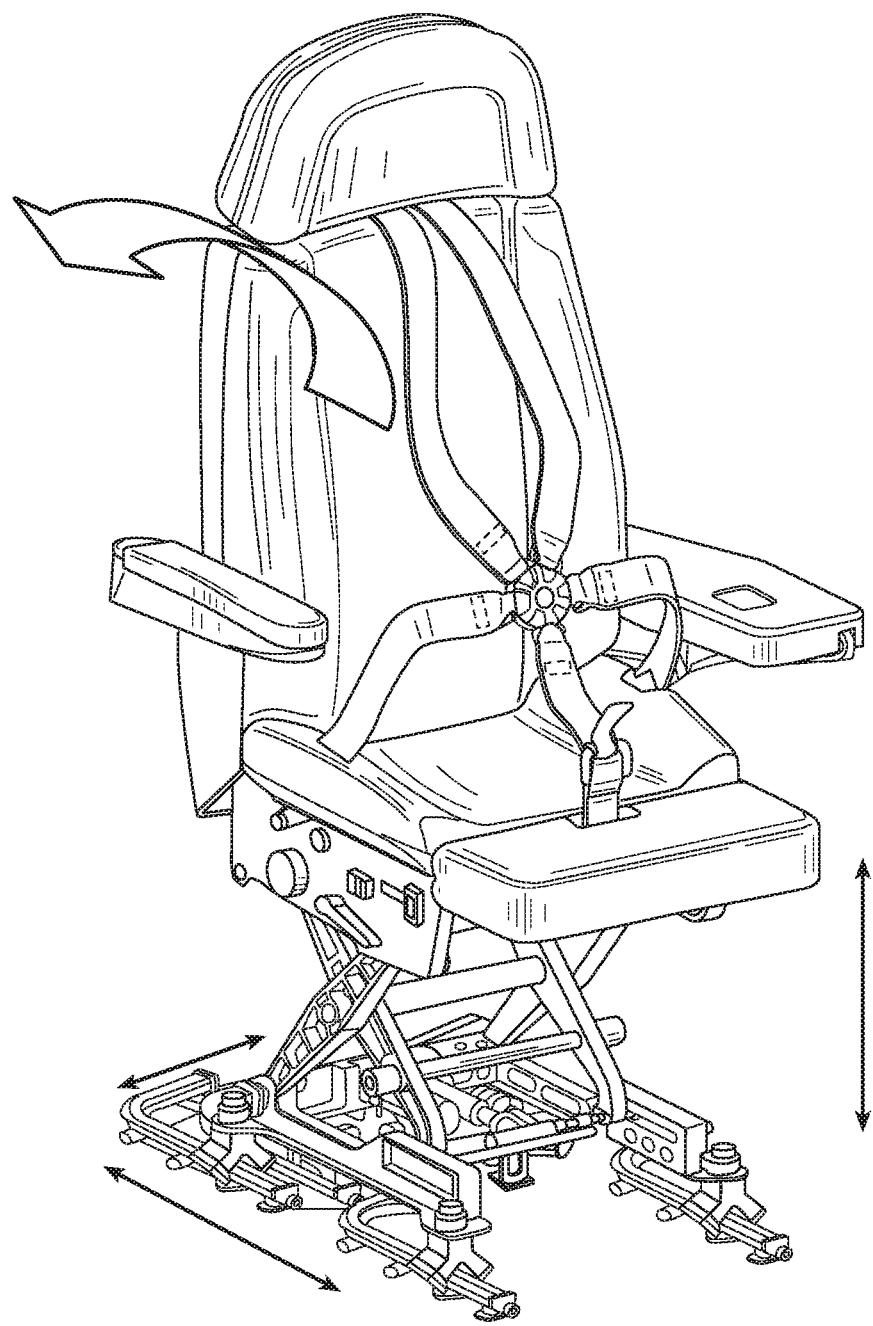
FIG. 1 is a perspective view of a conventional pilot seat.
Figure 2:
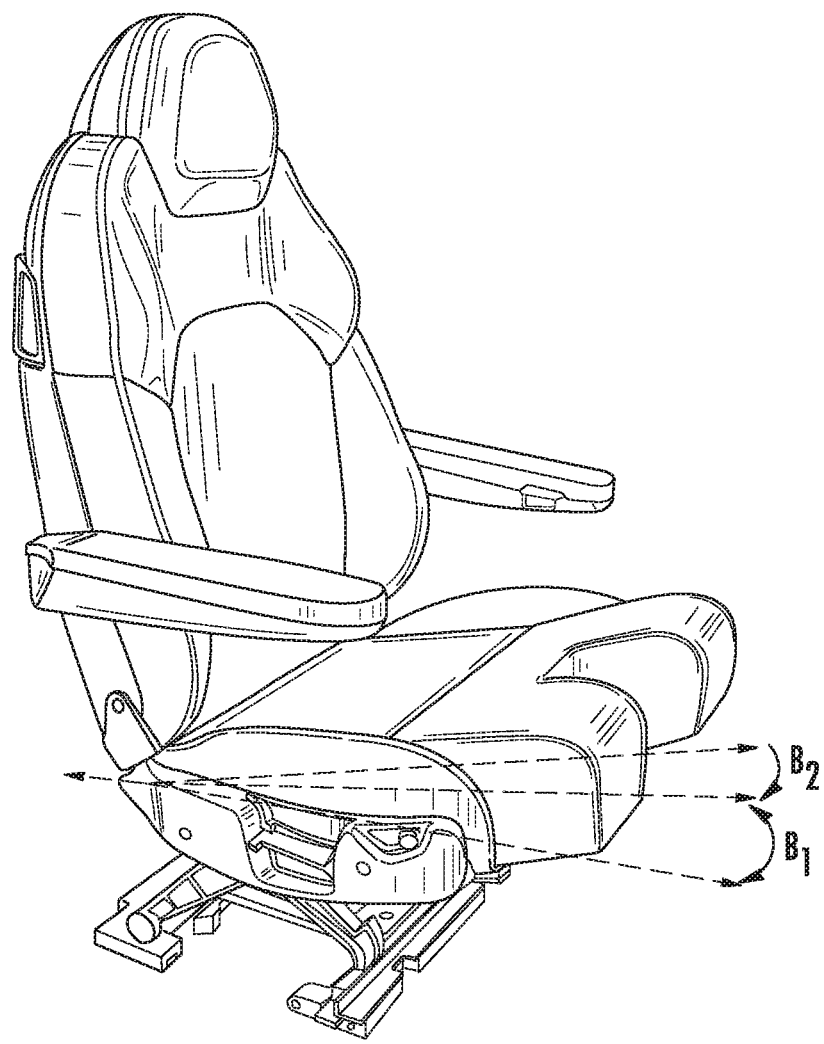
FIG. 2 is a perspective view of another version of a conventional pilot seat.
Figure 3:
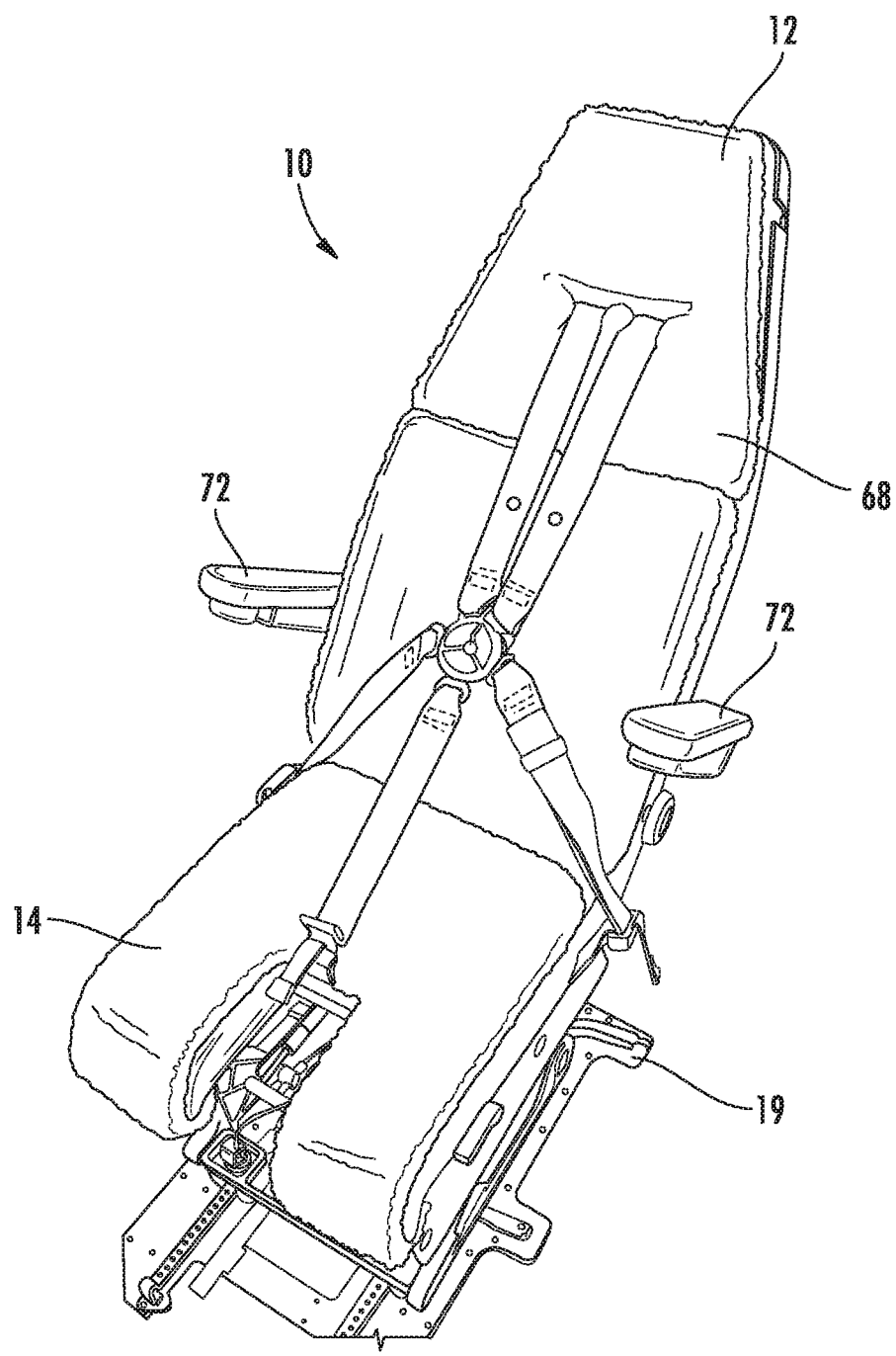
FIG. 3 is a perspective view of an adjustable seat, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

According to certain embodiments of the present invention, as shown in FIGS. 3-37, a seat 10 comprises a back rest having a lower portion 12 and an upper portion 68, a seat pan 14, and a seat frame 19 comprising a lower frame 16 and an upper frame 18. The seat 10 is configured with vertical and longitudinal adjustments, which allow the seat 10 to be adjusted so that the eye reference point ("ERP") 21 is the same for all persons seated in the seat 10, regardless of the person's height, as best shown in FIG. 5.

Figure 4:
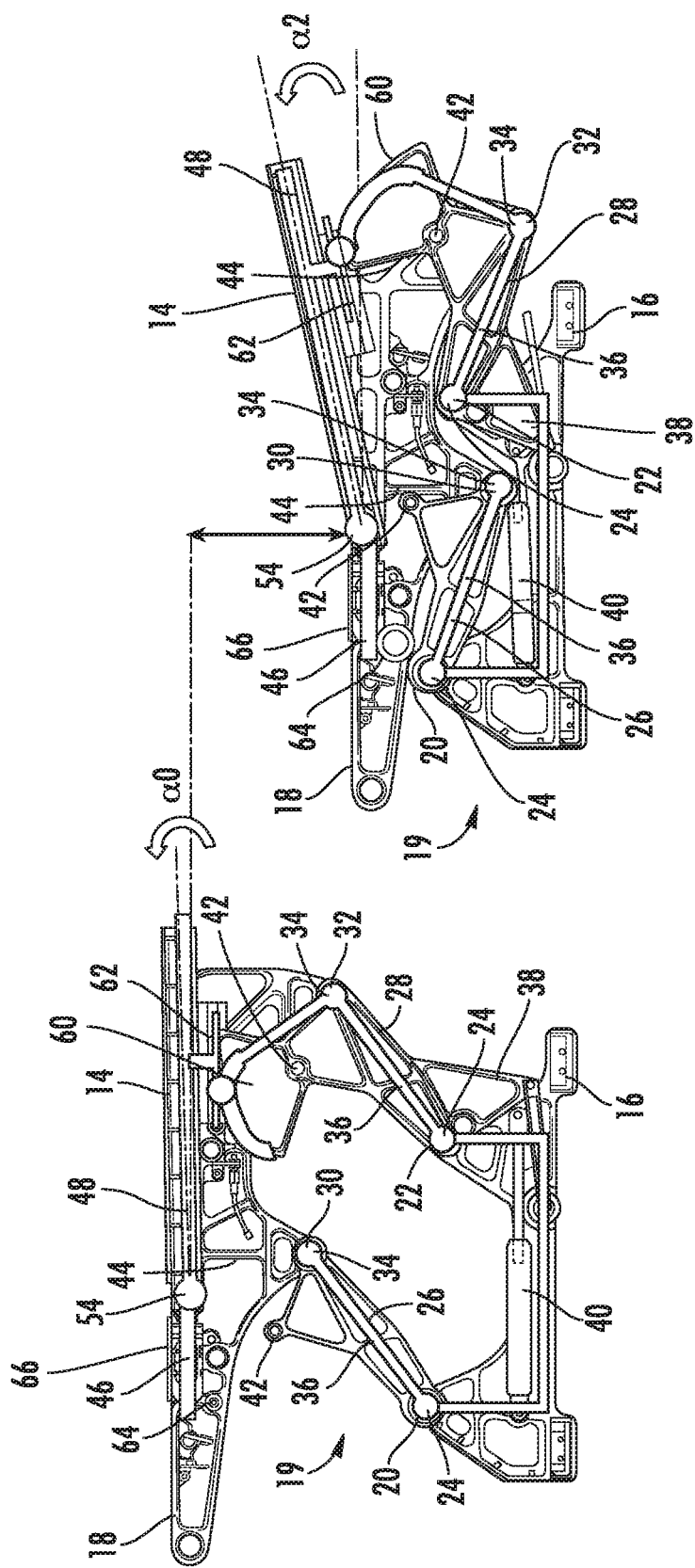
FIG. 4 are side views of a seat frame and seat pan of an adjustable seat in a fully raised position and a fully lowered position, according to certain embodiments of the present invention.
Figure 5:
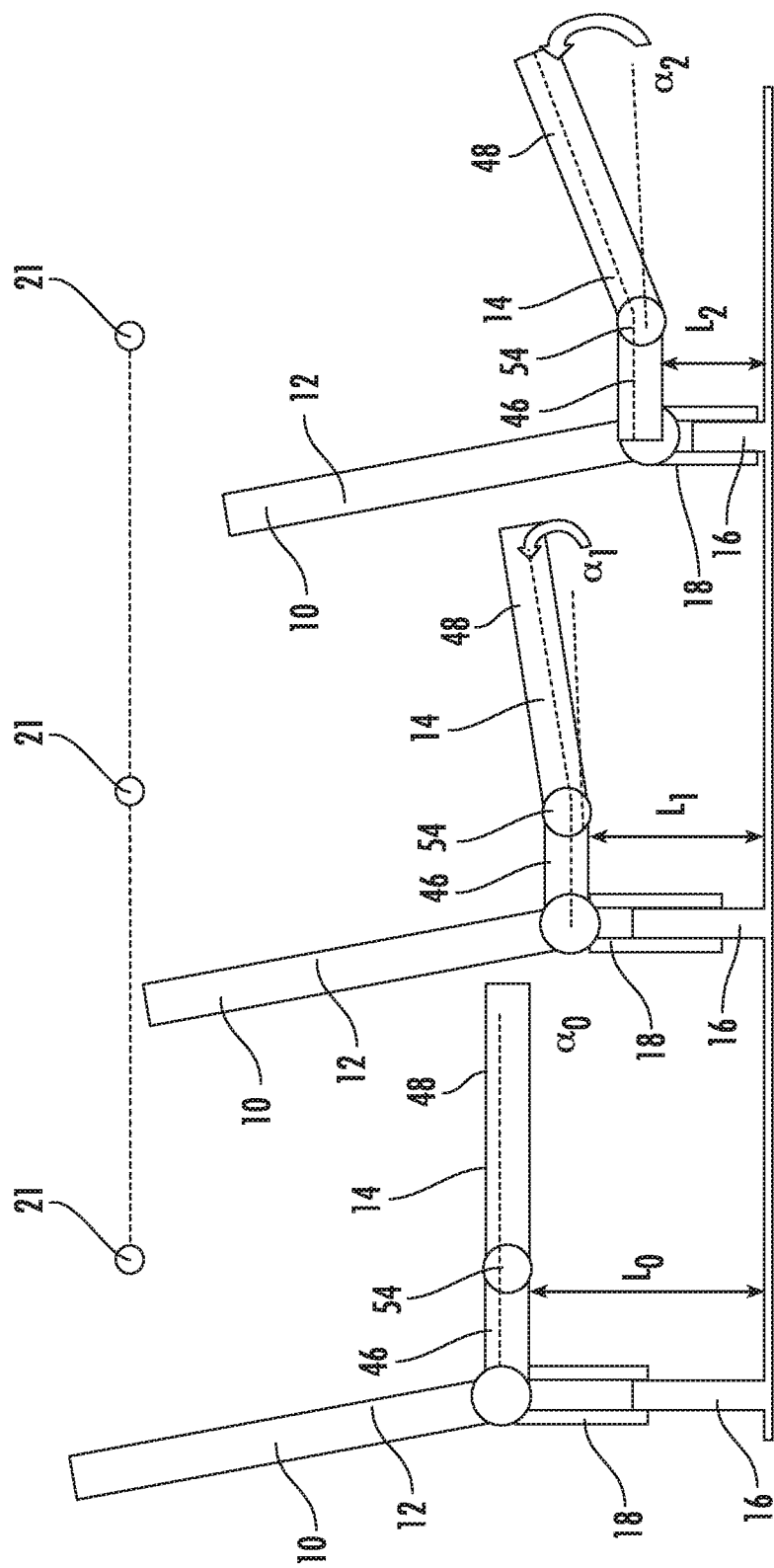
FIG. 5 are side views of an adjustable seat moving between a fully raised position and a fully lowered position while maintaining a constant eye reference point, according to certain embodiments of the present invention.
Figure 6:
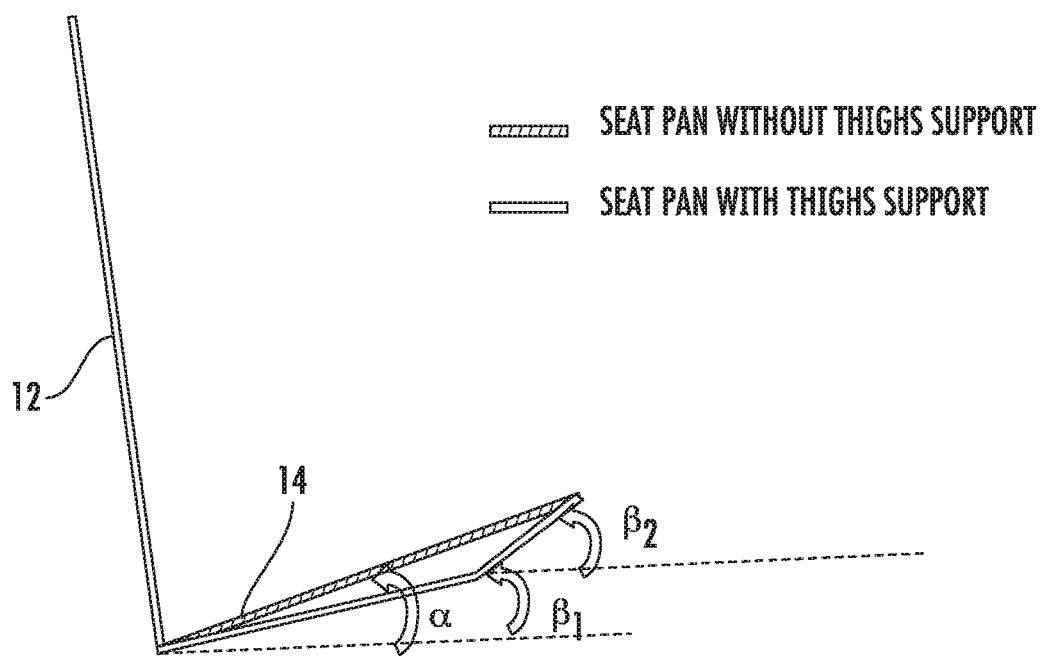
FIG. 6 is a side view comparing angles of a conventional seat and an angle of an adjustable seat, according to certain embodiments of the present invention.

In some embodiments, as best shown in FIG. 4, the lower frame 16 comprises a pair of rear projections 20 and a pair of front projections 22. A lower pivot location 24 is located at the top of each projection 20, 22. A pair of rear legs 26 are pivotally coupled to the lower pivot locations 24 on the rear projections 20, and a pair of front legs 28 are pivotally coupled to the lower pivot locations 24 on the front projections 22.

The upper frame 18 comprises a pair of rear projections 30 and a pair of front projections 32. An upper pivot location 34 is located at the bottom of each projection 30, 32. The rear legs 26 are pivotally coupled to the upper pivot locations 34 on the rear projections 30, and the front legs 28 are pivotally coupled to the upper pivot locations 34 on the front projections 32.

Each rear leg 26 and front leg 28 comprises a section 36 that is connected at one end to the upper pivot location 34 and at an opposing end to the lower pivot location 24. These sections 36 are configured to remain substantially parallel to one another as the upper frame 18 is raised and lowered relative to the lower frame 16 between a fully raised position (which corresponds to L0, as shown in FIG. 5) and a fully lowered position (which corresponds to L2, as shown in FIG. 5). The height difference between L0 and L2 may be less than 14 inches, may range from 11-13 inches, and may further range from 7-9 inches.

In certain embodiments, the front leg 28 may comprise a lower extension 38 that extends below the location where the section 36 is pivotally coupled to the lower pivot location 24. This lower extension 38 may in turn be pivotally coupled to a gas spring or other actuation mechanism 40 that is also coupled to a fixed portion of the lower frame 16. To lower the upper frame 18, the actuation mechanism 40 compresses, thereby rotating the lower extension 38 rearward about the lower pivot location 24, which in turn causes the section 36 of the front leg 28 to rotate forward and downward about the lower pivot location 24. As the section 36 of the front leg 28 rotates forward and downward, the upper pivot location 34 on the front projection 32 is also pulled forward and downward.

The forward and downward force on the front projection 32 also causes the rear projection 30 to exert a forward and downward force against the section 36 of the rear leg 26, which in turn causes the section 36 to rotate forward and downward about the lower pivot location 24 on the rear projection 22.

In certain embodiments, each rear leg 26 and front leg 28 comprises an upper extension 42, which is configured to contact a projection 44 of the upper frame 18 when the upper frame 18 is in the fully lowered position. The contact between the upper extension 42 and the projection 44 may be included to provide additional support to the actuation mechanism 40 to hold the upper frame 18 in the fully lowered position. In additional embodiments, the upper extensions 42 are connected by a bar 45.

To raise the upper frame 18, the actuation mechanism 40 extends, thereby rotating the lower extension 38 forward about the lower pivot location 24, which in turn causes the section 36 of the front leg 28 to rotate rearward and upward about the lower pivot location 24. As the section 36 of the front leg 28 rotates rearward and upward, the upper pivot location 34 on the front projection 32 is also pulled rearward and upward.

The rearward and upward force on the front projection 32 also causes the rear projection 30 to exert a rearward and upward force on the section 36 of the rear leg 26, which in turn causes the section 36 to rotate rearward and upward about the lower pivot location 24 on the rear projection 22.

Figure 15:
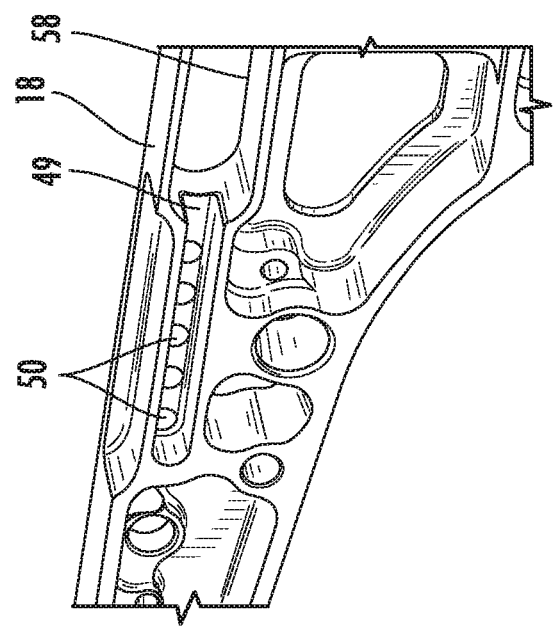
FIG. 15 is a perspective view of the slot of an upper frame of an adjustable seat with the seat pan removed to show the apertures in the slot, according to certain embodiments of the present invention.
Figure 14:
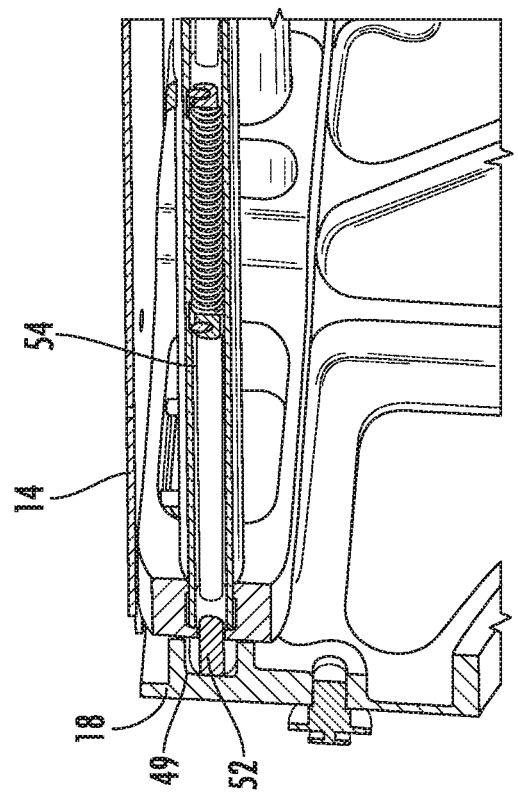
FIG. 14 is a cross-sectional view of a rear portion of a seat pan engaged with a slot of an upper frame of an adjustable seat, according to certain embodiments of the present invention.
Figure 16:
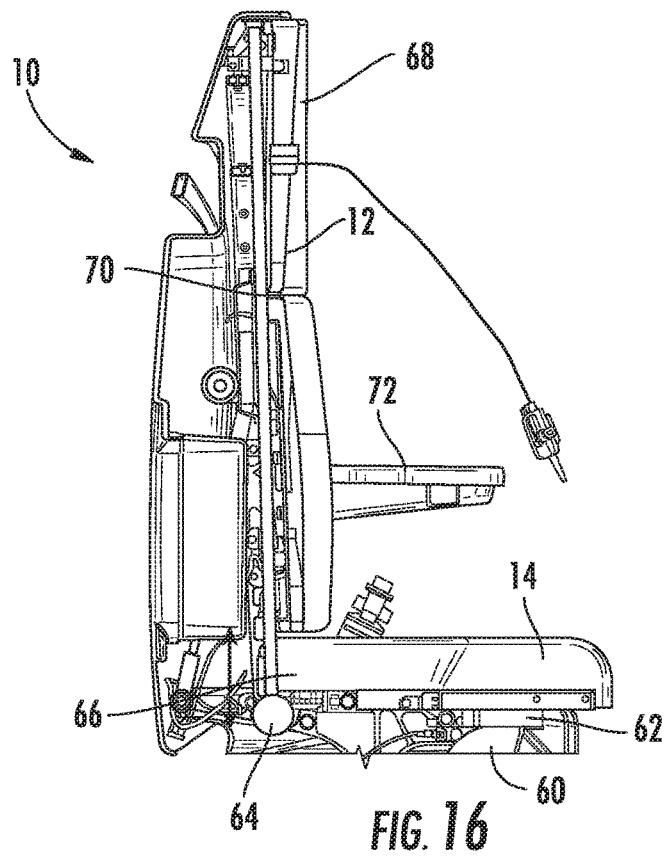
FIG. 16 is a side view of a lower portion of a back rest coupled to an upper frame of an adjustable seat at a location below a seat pan in an upright position, according to certain embodiments of the present invention.
Figure 17:
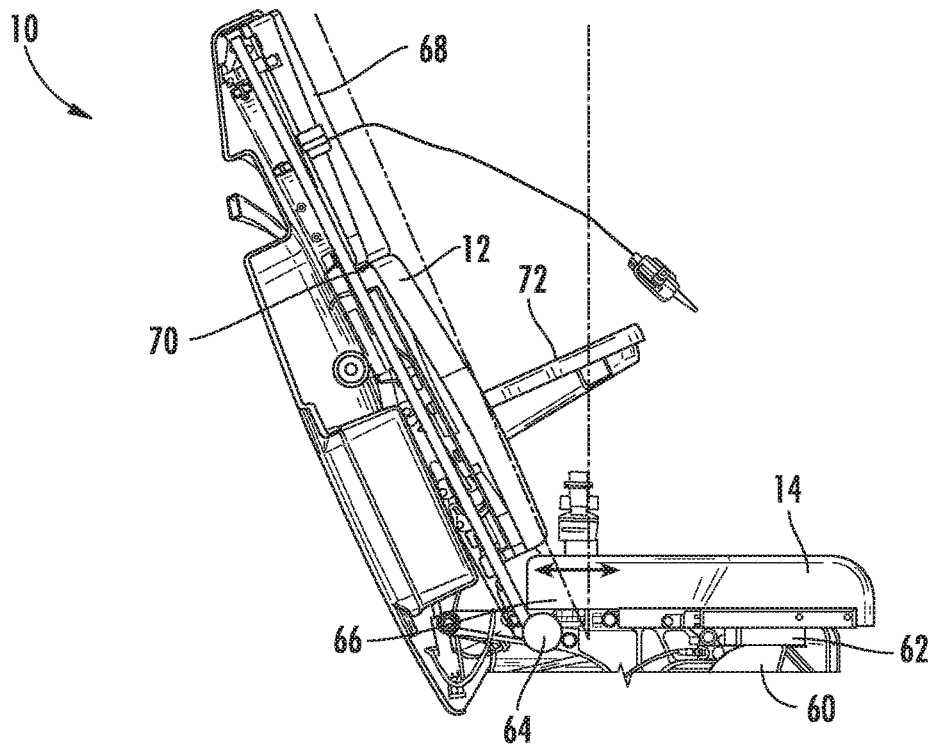
FIG. 17 is a side view of a lower portion of a back rest coupled to an upper frame of an adjustable seat at a location below a seat pan in a relaxed position, according to certain embodiments of the present invention.
Figure 20:
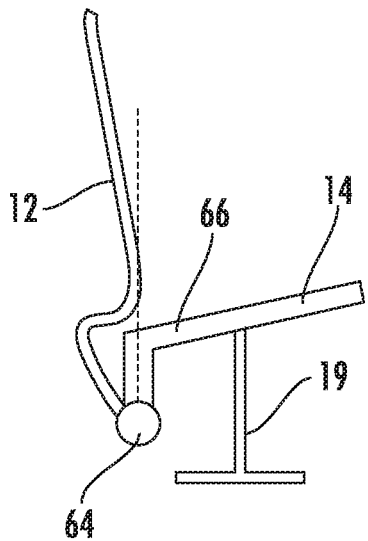
FIG. 20 is a side view of a lower portion of a back rest coupled to an upper frame of an adjustable seat at a location below a seat pan in an upright position, according to certain embodiments of the present invention.
Figure 21:
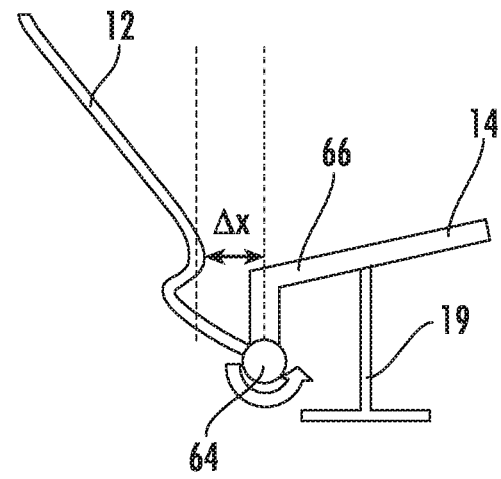
FIG. 21 is a side view of a lower portion of a back rest coupled to an upper frame of an adjustable seat at a location below a seat pan in a relaxed position and indicating the rearward movement of a cushion reference point when the lower portion of the back rest is in the relaxed position, according to certain embodiments of the present invention.
Figure 22:
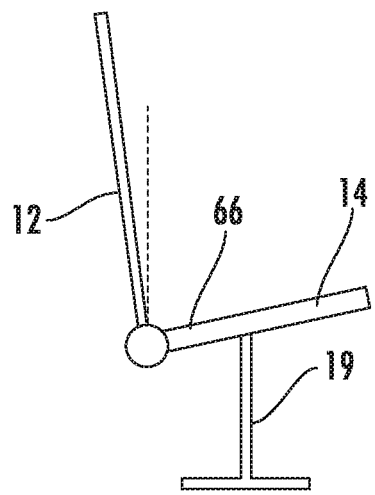
FIGS. 22 and 23 are side views of a back rest coupled to an upper frame of a conventional pilot seat in an upraised an relaxed position, respectively.
Figure 23:
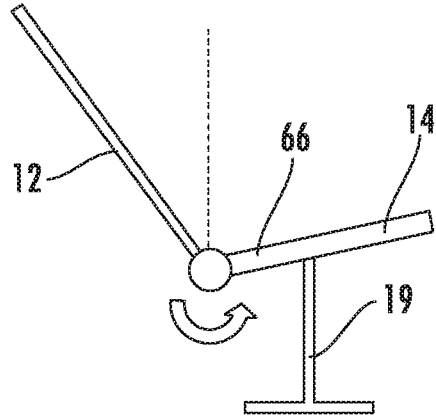
Figure 31:
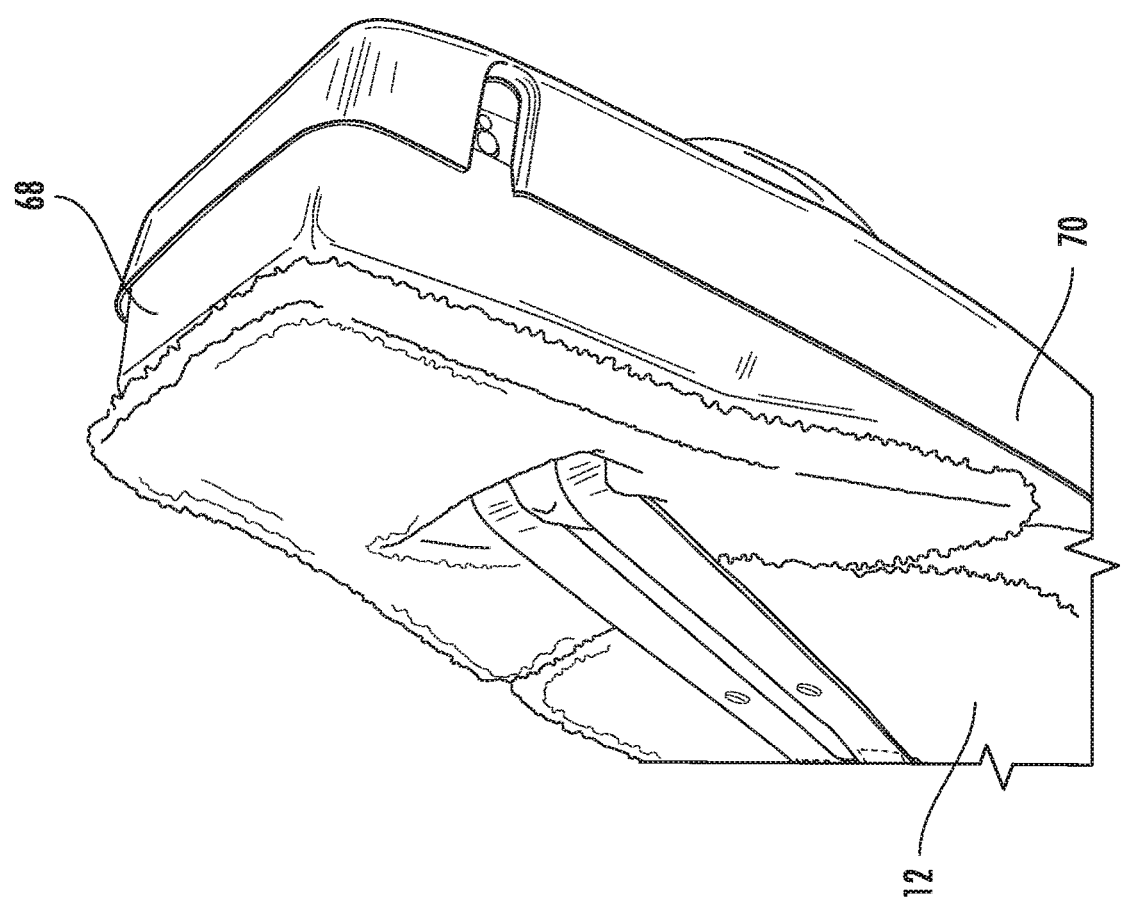
FIG. 31 is a perspective view of an upper portion of a back rest in an upright position, according to certain embodiments of the present invention.
Figure 32:
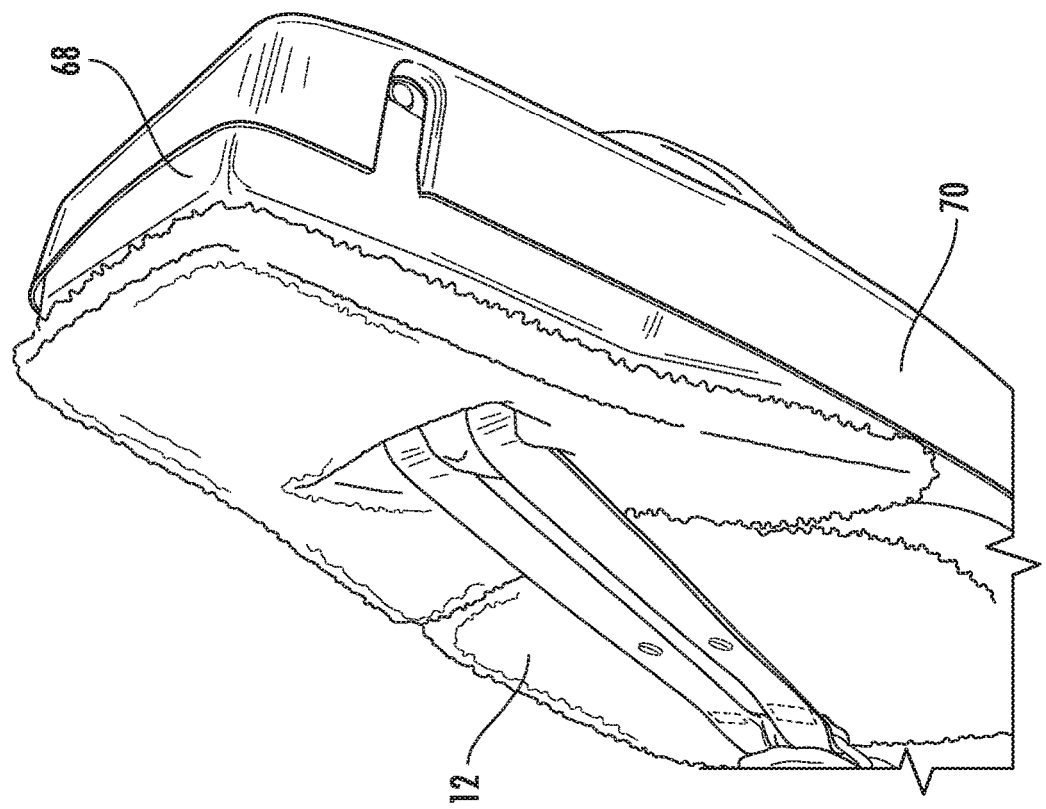
FIG. 32 is a perspective view of an upper portion of a back rest of an adjustable seat in a rotated position, according to certain embodiments of the present invention.

The seat pan 14 is attached to the upper frame 18 on a side opposite the location of the upper pivot locations 34. As best illustrated in FIGS. 7-9B, the seat pan 14 may be provided in two parts: a rear portion 46 and a front portion 48. A first end of the rear portion 46 may be slidingly coupled to a pair of slots 49 in the upper frame 18, as best illustrated in FIGS. 8 and 14-15. Each slot 49 comprises a series of apertures 50. The rear portion 46 may comprise a cross-bar 52, which releasably extends at each end into corresponding apertures 50 in the slots 49 to hold the rear portion 46 in position. To slide the seat pan 14 forward or rearward, the ends of the cross-bar 52 are compressed toward the center of the cross-bar 52 so that they no longer extend into the apertures 50, and the seat pan 14 then slides along the slots 49 in the desired direction. When the desired position is reached, the ends of the cross-bar 52 are released so that they extend into the aligned apertures 50, thereby locking the seat pan 14 into position within the slots 49. The amount of sliding adjustment of the seat pan 14 may be less than 10 inches, may range from 8-9 inches, and may further range from 6-7 inches.

Figure 7:
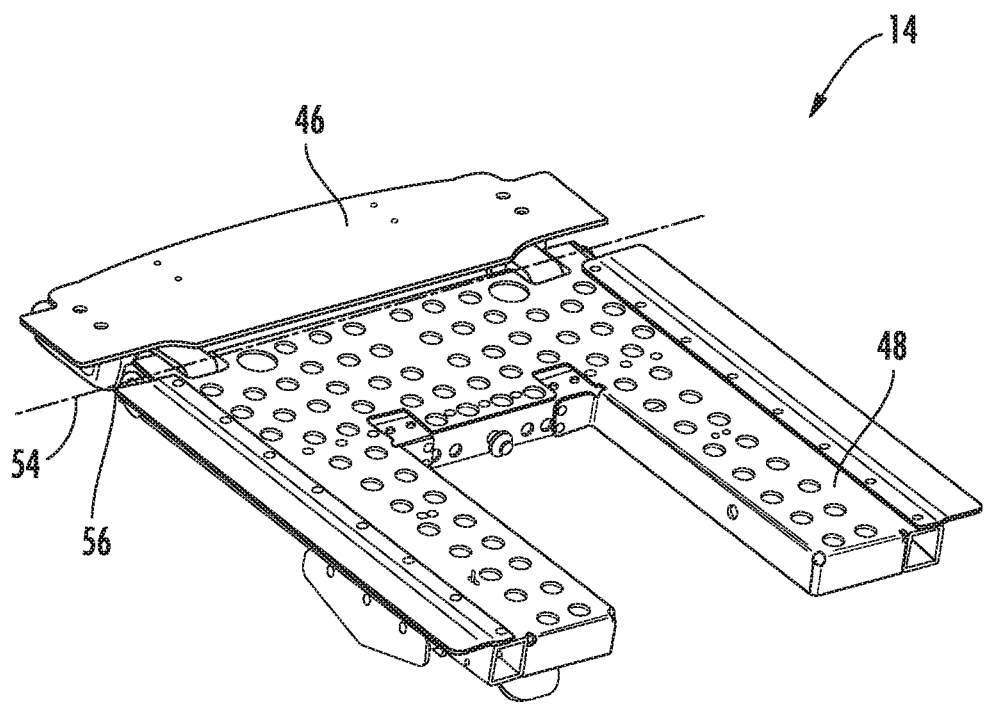
FIG. 7 is a perspective view of a seat pan of an adjustable seat, according to certain embodiments of the present invention.
Figure 8:
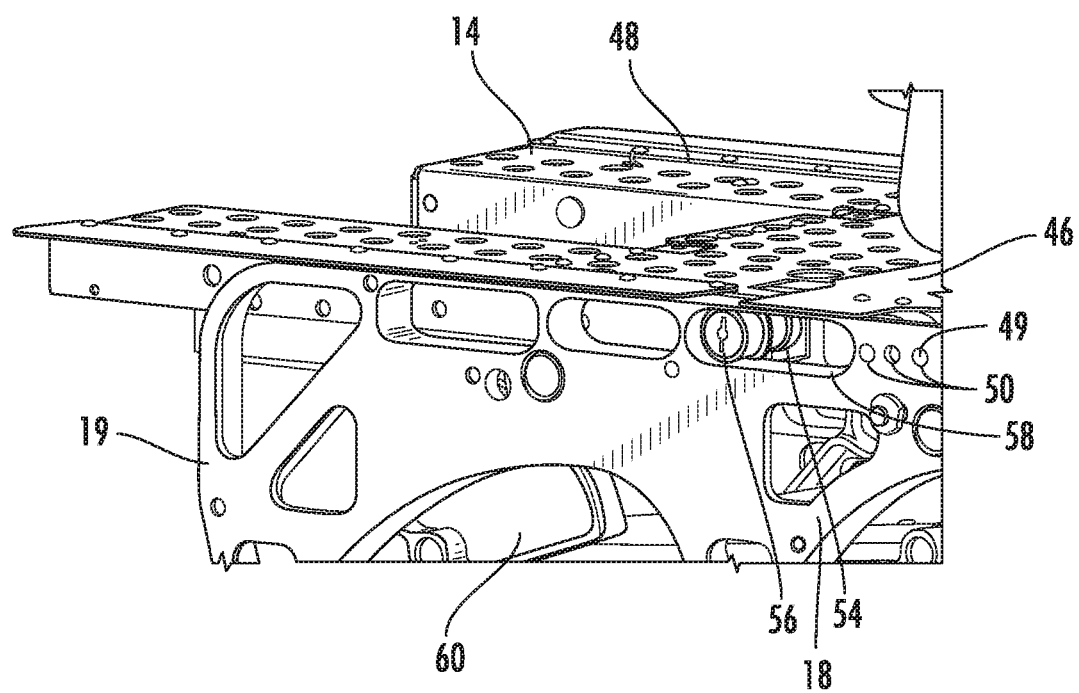
FIG. 8 is partial perspective view of a seat pan coupled to an upper frame of an adjustable seat, according to certain embodiments of the present invention.
Figure 13:
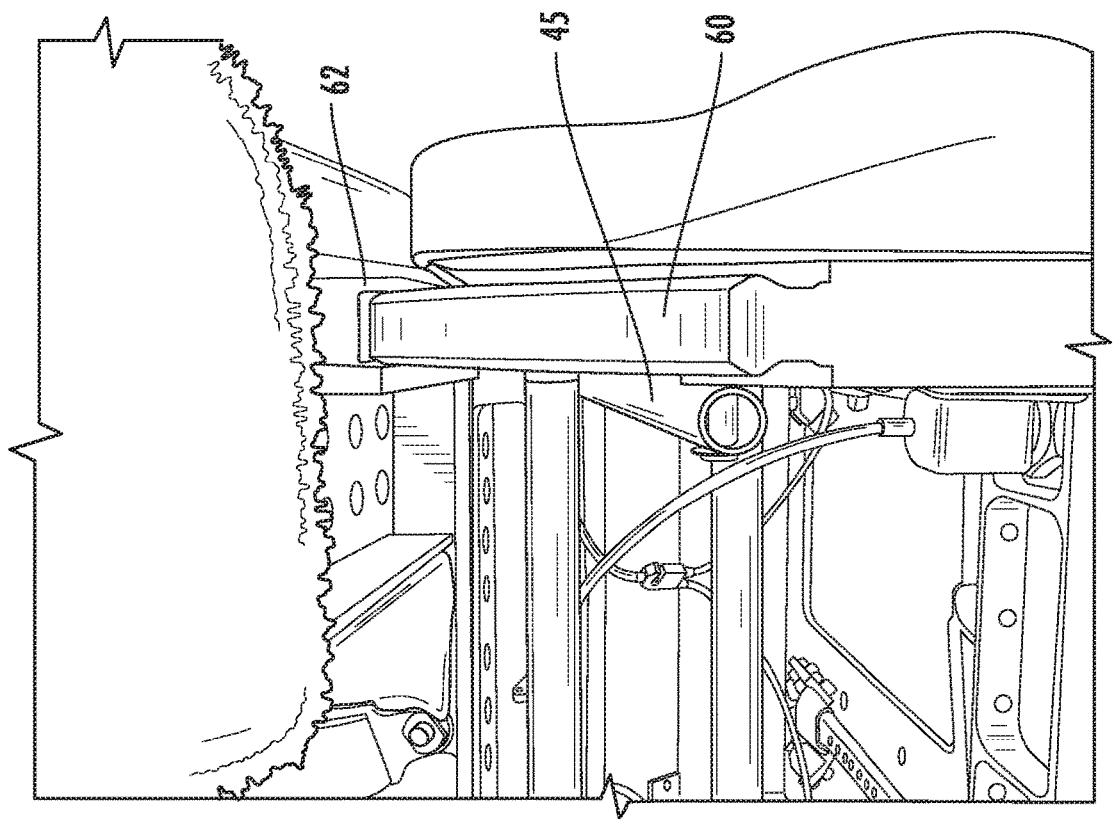
FIG. 13 is another perspective view of a portion of a seat frame of an adjustable seat in a fully raised position, according to certain embodiments of the present invention.
Figure 12:
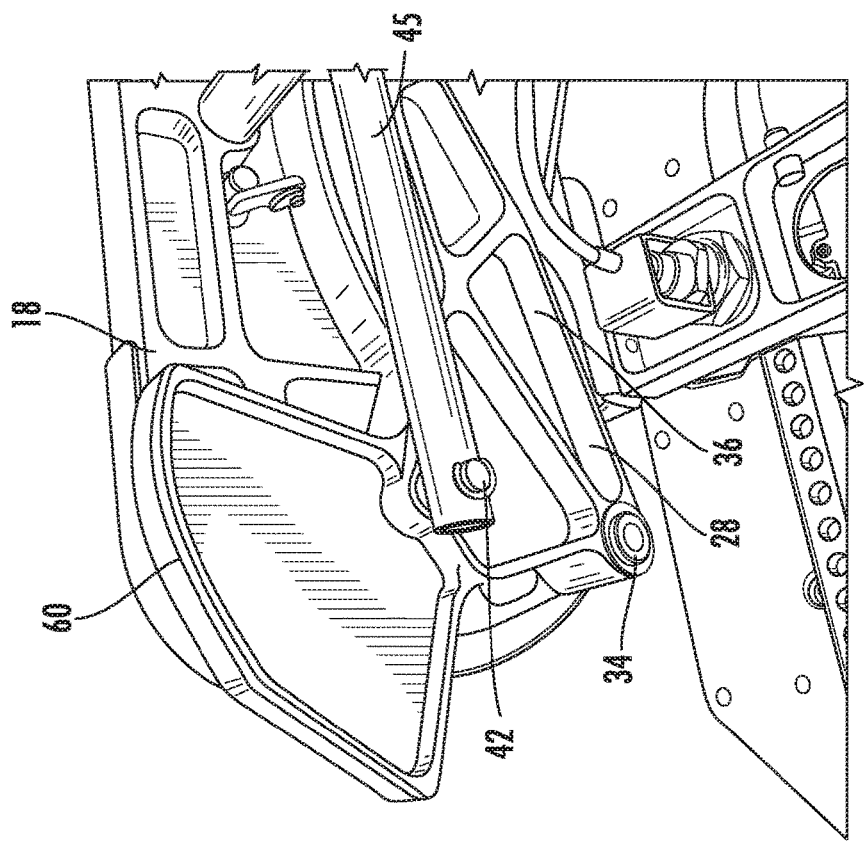
FIG. 12 is a perspective view of a portion of a seat frame of an adjustable seat in a fully raised position, according to certain embodiments of the present invention.

As best illustrated in FIGS. 4 and 7-8, a second end of the rear portion 46 may comprise a pivot axis 54, which may also slidingly coupled to the upper frame 18 via a pair of cams 56 positioned within slots 58 in the upper frame 18. The slots 58 may be configured to correspond in length to the slots 49.

As best illustrated in FIGS. 33-34, the sliding adjustment of the seat pan 14 provides a mechanism to adjust seat pan depth, which relieves pressure on the front thighs of a person seated in the seat 10. As the seat pan 14 slides rearward, there is additional room for a person to slide backward so that his or her lower back is able to contact the lower portion 12 of the back rest, which relieves backaches and pressure on that person's thighs by allowing some distance between the popliteal area (rear part of the knee) and the front of the seat pan 14. In particular, the seat pan 14 can be independently adjusted without impacting ERP.

FIGS. 24-26 illustrate embodiments of linkages between the upper frame 18 and the lower frame 16, as well as additional embodiments of a shape for the cam 60. In these embodiments, the linkages (i.e., the rear legs 26 and the front legs 28) are responsible for providing the vertical movement of the upper frame 18 relative to the lower frame 16, but the linkages may be oriented in any suitable configuration as needed or desired. Likewise, the cam 60 is shaped to matingly contact the lower surface 62 of the front portion 48, but the particular shape of the cam 60 may vary depending on the linkage design or as otherwise needed or desired. For example, it is conceivable that the cam 60 may be designed to lower the angle of the front portion 48 as the upper frame 18 is lowered.

As best illustrated in FIGS. 4-5, 7-8, and 9A-9B, in some embodiments, the front portion 48 of the seat pan 14 may be pivotally coupled to the pivot axis 54, which allows the front portion 48 to articulate upward so that it is positioned at an angle $\alpha$ relative to the rear portion 46. The angular position of the front portion 48 may be controlled by the actuation mechanism 40 via an eccentric cam 60 that extends above the location where the section 36 is pivotally coupled to the upper pivot location 34. The eccentric cam 60 is configured so that an outer surface of the cam 60 is in mating contact with a lower surface 62 of the front portion 48 as the upper frame 18 moves between the fully raised and fully lowered positions. As the section 36 rotates about the upper pivot location 34, the cam 60 also rotates so that the lower surface 62 contacts different points of the curved surface of the cam 60 over the rotational path. The cam 60 may then be shaped to raise the front portion 48 at certain points along the rotational path, and lower the front portion 48 at other points along the rotational path.

In certain embodiments, as best shown in FIGS. 4-5, 9A, and 10-11, the cam 60 is configured so that the front portion 48 forms an angle $\alpha 0$ relative to the rear portion 46 when the upper frame 18 is in the fully raised position. In this position, the front portion 48 is approximately parallel with the rear portion 46. As the upper frame 18 is lowered, the cam 60 causes the front portion 48 to progressively rotate upward so that at a mid-point height, the front portion 48 forms an angle $\alpha 1$ relative to the rear portion 46, as best illustrated in FIG. 5. When the upper frame 18 reaches the fully lowered position, as best shown in FIGS. 4-5, 9B, and 12-13, the cam 60 causes the front portion 48 to reach the maximum upwardly rotated position so that the front portion 48 forms an angle $\alpha 2$ relative to the rear portion 46. In other words, the front portion 48 of the seat pan 14 rotates and is linked to the height L of the seat 10 to provide continuous thigh support for a person seated in the seat 10. The difference between $\alpha 0$ and $\alpha 2$ may range from −10 to +25 degrees, may further range from −5 to +20 degrees, and may still further range from 0 to +15 degrees.

In certain embodiments, as best illustrated in FIGS. 16-28, the lower portion 12 of the back rest may be coupled to a location 64 on the lower frame 16, which is below a rear end 66 of the seat pan 14. By way of background, a cushion reference point or "CRP" is defined as the intersection between a plane of the seat pan cushion and a plane of the back rest cushion. By lowering the pivot location 64 below the seat pan 14, the CRP moves rearward when the lower portion 12 of the back rest is in the relaxed position. The rearward movement of the CRP in the relaxed position provides additional reclining comfort by offering a better cradle position via more space on the seat pan 14 without changing or extending the length of the seat pan or the back rest. The distance that the CRP moves backward in the relaxed position may range from 0-5 inches, may further range from 0-7 inches, and may still further range from 0-10 inches.

In certain embodiments, the seat pan 14 also has a slight tilt when reclining the lower portion 12 of the back rest to prevent a sliding sensation. In some embodiments, as best shown in FIGS. 18-21, the lower portion 12 of the back rest may have a curved shape that allows the lower portion 12 of the back rest to extend over the rear end 66 of the seat pan 14 in the upright position.

In certain embodiments, as best illustrated in FIGS. 3, 18-19, and 29-32, the upper portion 68 of the back rest is configured to pivotally couple to the lower portion 12 of the back rest at a pivot axis 70 located at an upper end of the lower portion 12 of the back rest. The location of the pivot axis 70 may approximate a position below a shoulder blade of a person seated in the seat 10. By lowering the pivot axis 70, the upper portion extends sufficiently high to accommodate any person's size seated in the seat 10, and has a pivot location that is sufficiently low so that the upper portion 68 of the back rest maintains contact with a head of a person seated in the seat 10 in any position, vertical adjustment of the upper portion 68 of the back rest is not needed because the length of the upper portion 68 of the back rest will be positioned to contact heads of people having a broad range of heights who are seated in the seat 10.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An adjustable seat comprising:
   a seat frame comprising an upper frame pivotally coupled to a lower frame;
   a seat pan comprising a rear portion and a front portion pivotally coupled to the rear portion, wherein the rear portion is attached to the upper frame;
   an actuation mechanism configured to simultaneously control a vertical height of the upper frame and a rotational position of the front portion of the seat pan;
   a lower portion of a back rest attached to the seat frame, wherein an upper end of the lower portion of the back rest comprises a pivot axis; and an upper portion of the back rest pivotally coupled to the lower portion of the back rest at the pivot axis;

wherein a location of the pivot axis is configured to be positioned below a person's shoulders when the person is seated in the adjustable seat;

wherein the upper portion of the back rest is pivotally adjustable relative to the lower portion of the back rest;

wherein a pair of front legs and a pair of rear legs are each pivotally coupled to each of the upper frame and the lower frame; and wherein each front leg of the pair of front legs comprises an eccentric cam having an outer surface in mating contact with a lower surface of the front portion.

2. The adjustable seat of claim 1, wherein the lower portion of the back rest is pivotally coupled to the upper frame at a location below the seat pan and is configured to pivotally adjust between an upright and a relaxed position.

3. The adjustable seat of claim 2, wherein the lower pivot location results in a rearward movement of a cushion reference point when the lower portion of the back rest is in the relaxed position.

4. The adjustable seat of claim 1, wherein the rear portion is slidably coupled to the upper frame.

5. An adjustable seat comprising:

a seat frame comprising an upper frame pivotally coupled to a lower frame;

a seat pan comprising a rear portion and a front portion pivotally coupled to the rear portion, wherein the rear portion is attached to the upper frame;

a lower portion of a back rest pivotally coupled to the upper frame at a location below the seat pan and configured to pivotally adjust between an upright and a relaxed position; and an actuation mechanism that is configured to simultaneously control a vertical height of the upper frame and a rotational position of the front portion of the seat pan;

wherein a pair of front legs and a pair of rear legs are each pivotally coupled to each of the upper frame and the lower frame; and wherein each front leg of the pair of front legs comprises an eccentric cam having an outer surface in mating contact with a lower surface of the front portion.

6. The adjustable seat of claim 5, wherein a lower pivot location results in a rearward movement of a cushion reference point when the lower portion of the back rest is in the relaxed position.

7. The adjustable seat of claim 5, further comprising an upper portion of the back rest pivotally coupled to the lower portion of the back rest via a pivot axis located at an upper end of the back rest, wherein a location of the pivot axis is configured to be positioned below a person's shoulders when the person is seated in the adjustable seat.

8. The adjustable seat of claim 5, wherein the rear portion is slidably coupled to the upper frame.

9. An adjustable seat comprising:

a seat frame comprising an upper frame pivotally coupled to a lower frame;

a seat pan comprising a rear portion and a front portion pivotally coupled to the rear portion, wherein the rear portion is attached to the upper frame;

a lower portion of a back rest attached to the seat frame, wherein an upper end of the lower portion of the back rest comprises a pivot axis; and an upper portion of the back rest pivotally coupled to the lower portion of the back rest at the pivot axis;

wherein a location of the pivot axis is configured to be positioned below a person's shoulders when the person is seated in the adjustable seat;

wherein the upper portion of the back rest is pivotally adjustable relative to the lower portion of the back rest;

wherein a pair of front legs and a pair of rear legs are each pivotally coupled to each of the upper frame and the lower frame; and wherein each front leg of the pair of front legs comprises an eccentric cam having an outer surface in mating contact with a lower surface of the front portion.

10. An adjustable seat comprising:

a seat frame comprising an upper frame pivotally coupled to a lower frame;

a seat pan comprising a rear portion and a front portion pivotally coupled to the rear portion, wherein the rear portion is attached to the upper frame; and an actuation mechanism that is configured to simultaneously control a vertical height of the upper frame and a rotational position of the front portion of the seat pan;

wherein a pair of front legs and a pair of rear legs are each pivotally coupled to each of the upper frame and the lower frame; and wherein each front leg of the pair of front legs comprises an eccentric cam having an outer surface in mating contact with a lower surface of the front portion.

* * * * *